Dec. 21, 1965  J. HUTTERER  3,224,127
MOVABLE DISPLAY DEVICE
Filed March 18, 1963  2 Sheets-Sheet 1

INVENTOR.
JOHANN HUTTERER
BY
*Imirie & Smiley*
ATTORNEYS

Dec. 21, 1965   J. HUTTERER   3,224,127
MOVABLE DISPLAY DEVICE
Filed March 18, 1963   2 Sheets-Sheet 2

INVENTOR.
Johann Hutterer
BY
ATTORNEY

United States Patent Office 3,224,127
Patented Dec. 21, 1965

3,224,127
MOVABLE DISPLAY DEVICE
Johann Hutterer, 2 Negerlegasse, Vienna II, Austria
Filed Mar. 18, 1963, Ser. No. 265,851
Claims priority, application Austria Mar. 22, 1962
2 Claims. (Cl. 40—86)

This invention relates to a device for moving the successive fields of a representation divided into such fields, such as a map, picture of the like, into a viewing field. The main advantage of the device resides in the low cost of manufacture, the extreme simplicity of the manipulation and the quick adjustment of the picture.

An important feature of the invention resides in that the device comprises a housing, a spool mounted in said housing for winding one end of the strip, a second spool extending parallel to the first spool and serving to wind the other end of the strip, said viewing field being disposed between the two spools, means for guiding the strip through the viewing field during the movement of the strip from one of said spools to the other, means for selectively manually driving one of the two spools in the driving sense, said means comprising a cord drive drivingly connecting the two spools and a slide member secured to said cord drive, said slide member being movable along the housing between the spools.

Another feature of the invention resides in that each of said two spools is mounted on a shaft guided in the housing and is coupled to said shaft for joint rotation by a disengageable clutch member, each shaft having freely rotatably mounted on it a grooved pulley, which is operable by the cord drive and is adapted to be coupled to the spool for joint rotation.

Finally, it is a feature of the invention that the slide member is connected to two cords, the ends of which are attached to both grooved pulleys and each of which is wound in one end position of the slide and the other around the respective adjoining grooved pulley in a length which is at least as large as the length of the path along which the slide member is adjustable.

Figure 1:
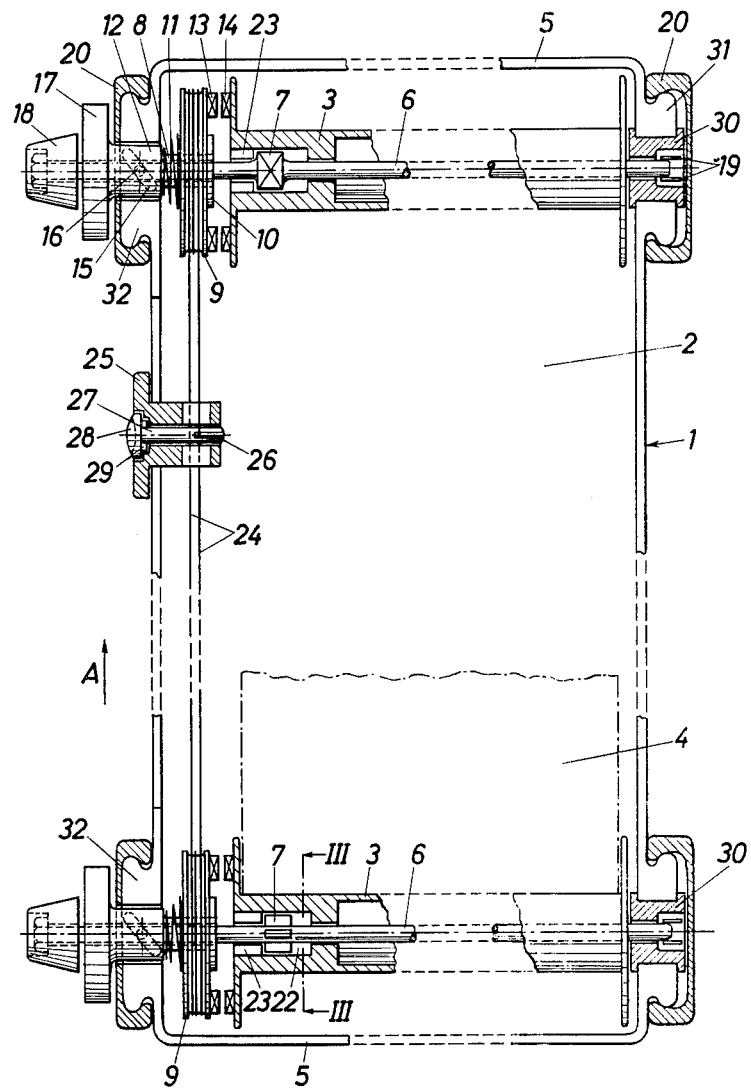
Figure 2:
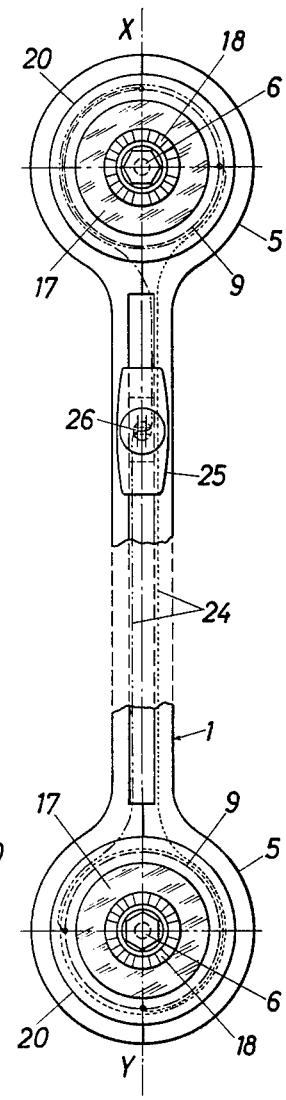
Figure 4:
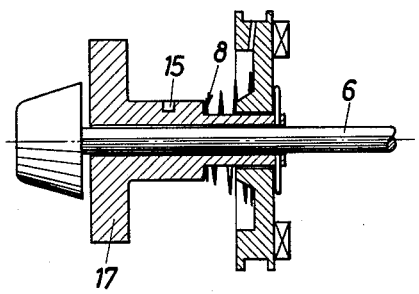
Figure 5:
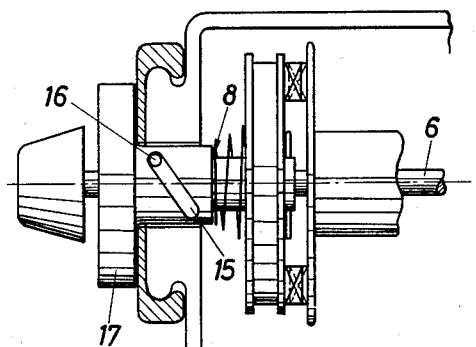
Figure 5:
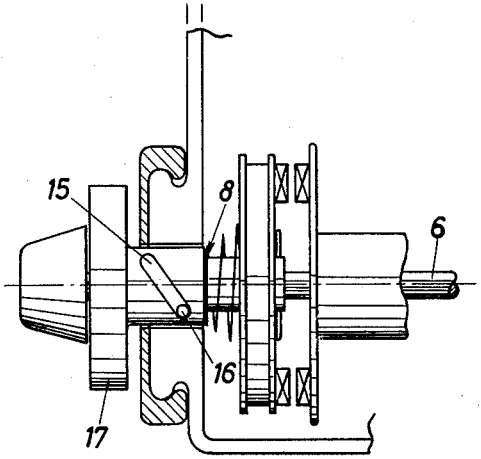

An illustrative embodiment of the device according to the invention is shown in the drawing. FIG. 1 is a sectional view taken through the horizontal center plane of the device and showing in the top and bottom portions different forms of the clutch between the spool for winding the strip and the shaft carrying said spool. FIG. 2 is a side elevation showing the device and FIG. 3 a sectional view taken on line III—III of FIG. 1. FIG. 4 is a fragmentary sectional view axially of one of the sleeves 8 and FIG. 5 is a sectional view similar to the left hand portion of FIG. 1 but showing various elements as engaged and disposed for moving a strip in the upward direction rather than in neutral positions occupied when the strip is stationary.

The device according to the invention may serve, for instance, for accommodating map fields composed to form a strip. As is apparent from FIGS. 1 and 2, the device has a flat housing 1, the length of which is about the same as that of the map field to be viewed. The housing consists suitably of transparent material, such as a transparent plastic, and forms at the same time the viewing field, in which the map is apparent to the viewer. The housing consists suitably of two halves, which have mirror symmetry with respect to the longitudinal center plane X—Y and are superimposed and connected when the components described hereinafter have been inserted. The flat housing 1 is provided at each of its ends with a cylindrical enlarged portion 5, the peripheral surface of which merges into the walls of the housing 1. Each of the two enlarged portions 5 accommodates a spool 3, which is carried by a shaft 6 and serves for winding one end of the strip 4 to be viewed. The shafts 6 are axially displaceable and are mounted at one end in a bushing 30 and at the other in a spacer sleeve 8. The bushings 30 are firmly mounted in one end wall 31 of the enlarged housing portions 5 and the spacer sleeves 8 are rotatably mounted in the other end wall 32 of the enlarged housing portions 5. Each shaft 6 carries a clutch member 7. Each spacer sleeve 8 has a grooved pulley 9 axially slidably and freely rotatably mounted on it. The pulley 9 is under the action of a compression spring 11, which bears on a collar 12 of the sleeve 8. The pulley 9 bears on a pin 10 extending through the sleeve 8 and is provided with teeth 13, which can be caused to mesh with complementary teeth 14 of the spool 3. The teeth 13, 14 are similar to a ratchet gear and drive the spool 3 only in that direction in which the spool winds up the strip 4.

The collar 12 of the sleeve 8 is formed with a slot 15, which is inclined with respect to the longitudinal axis of the shaft 6 and engaged by a pin 16 extending from the enlarged housing portion 5. Handles 17 and 18, respectively, are provided at the outer end of the collar 12 and at that end of the shaft 6 which protrudes from this collar. A brake spring 19, the function of which will be described hereinafter, is disposed at the other end of the shaft 6. The bearing portions of the shaft 6 are protected by a cap 20 each from the ingress of dirt etc.

Figure 3:
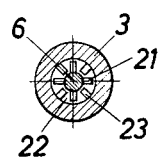

As is shown in FIGS. 1 and 3, the clutch member 7 is disengageable. It comprises teeth 21, which extend radially outwardly from the shaft 6 and in the disengaged position of the clutch 7 are freely rotatably disposed in a recess 22 of the spool 3. At the outer end of the recess 22, teeth 23 are provided, which are spaced apart and extend radially from the inside wall of the spool 3. When the clutch 7 is engaged, the teeth 21 are disposed in the spaces between the teeth 23.

The grooved pulleys 9 are connected for rotating in unison by a rope drive 24 consisting of two ropes 24. As is apparent from FIG. 2, two opposite ends of the two ropes are wound in more than one turn around the associated grooved pulleys. For the sake of clarity, only one turn and a half is shown in the present case. The other ends of the ropes contact the pulleys 9 only around a small angle, which in one of the end positions of the rope drive is with one grooved pulley as large as or slightly in excess to the distance through which the rope drive is moved whereas with the second pulley said angle is virtually zero or as large as said excess.

To operate the rope drive, a slide member 25 is provided, which is guided along the longitudinal edge of the housing 1 and which has inserted in it a tensioning pin 27 formed with a slot 26, through which one of the ropes 24 of the rope drive extend. This rope is connected to the tensioning pin 27. A rotation of the pin 27 will thus cause the connected rope 24 to be wound on the pin 27 so that its tension will be increased. To locate the tensioning pin 27 in its adjusted position, ratchet teeth 29 are provided on the head 28 of the pin 27 on that side thereof which faces the slide member 25. When the pin 27 is rotated in a tightening sense, these teeth 29 slip over complementary teeth provided on the slide member 25 whereas the teeth 29 interengage with these complementary teeth in the other direction of rotation.

The described device operates as follows: To move the strip 4 in the direction of the arrow A in the device shown in FIG. 1, the handle 17 of the sleeve 8 shown in the upper portion of FIG. 1 is rotated in the cliockwise sense so that the sleeve 8 is moved toward the spool 3 and causes the teeth 13 and 14 to interengage. In this position, the associated grooved pulley 9 is coupled to the spool 3 adjacent thereto. During this movement, the grooved pulley 9 shown in the lower portion of FIG. 1 remains disengaged from its associated spool 3. When the slide member 25 is now moved in the direction of arrow A, it will rotate both pulleys 9 in the clockwise sense by means of the rope drive 24. The upper pulley 9 drives the spool 3 in the same sense. During the return movement of the slide member 25, the teeth 13 of the upper pulley 9 slip over the teeth 14 of the spool 3. During the relative slipping of the teeth 13, 14, the brake spring 19 prevents an unintended return rotation of the shaft 6 and of the spool 3, provided that the clutch is designed as is shown in the upper portion of FIG. 1 or, if the design shown in the lower portion is adopted, that the teeth 21 interengages with the teeth 23.

If the strip 4 is to be moved in the opposite direction, the uper handle 17 is rotated in the counterclockwise sense and the lower handle is rotated in the clockwise sense so that the upper grooved pulley 9 is disengaged from its spool 3 and the lower grooved pulley is coupled to its spool.

Finally, the spools 3 may be moved in one direction or the other by means of the handles 18. For this purpose, both grooved pulleys 9 must be disengaged from the spools associated with them and, if the clutches 7 are designed as shown in the lower portion of FIG. 1, the teeth 21 must interengage with the teeth 23. With a clutch 7 of this design, the interengagement and disengagement of the teeth 21, 23 are effected by an axial displacement of the shaft 6. The teeth 21, 23 are disengaged only if the strip is to be freely unwound from the spool 3.

It will be understood that the housing may consist of any desired material. When it is made from transparent material, as has been mentioned initially hereinbefore, the strip 4 may bear map pictures on the front and rear sides. In this case, it is suitable to provide on the rear side of the strip that card section which succeeds the card section disposed on the front side of the strip 4 at that longitudinal edge of the latter card strip which is remote from the slide member 25. E.g., a car driver who has reached on a road the position shown at the right-hand longitudinal edge of the strip when the device is in the position shown in FIG. 1, will then be able simply to reverse the device to find on the rear side a continuation of the map picture, just as on the folded map.

What is claimed is:

1. A device for moving the successive fields of a representation divided into such fields, such as a map, picture or the like, into a viewing field, comprising a housing, a spool mounted in said housing for winding one end of a strip having said representations thereon, a second spool extending parallel to the first spool and serving to wind the other end of the strip, each of the said two spools being mounted on a shaft guided in the housing and being disengageably coupled to said shaft for joint rotation by a clutch, each of said spools having teeth on one end face, said viewing field being disposed between the two spools, means for guiding the strip through the viewing field during the movement of the strip from one of said spools to the other, and means for selectively manually driving one of the two spools in the driving sense, said means comprising a pair of pulleys each having a circumferential groove and each carrying teeth on its end face adapted to interengage said teeth of one of said spools to drive the latter only in the direction of rotation in which it winds up the strip, a cord drive engaged in said circumferential grooves to drivingly connect said pulleys, a slide member secured to said cord drive and movable along the housing between the spools, each of said pulleys being freely rotatably mounted and axially displaceable on one of said shafts with respect to a coaxial one of said spools, said pulley, spool and shaft being coupled together for joint rotation by said clutch and said teeth, each grooved pulley being freely rotatable and axially displaceable on a sleeve having a collar at its inner end and a projecting member adjacent the cooperating spool, said shaft extending through said sleeve, and a spring bearing against the collar and one end of the pulley urging the pulley toward the spool and said projecting member, each shaft and each sleeve being provided with a handle which protrudes outside of said housing.

2. A device as set forth in claim 1, wherein each sleeve is provided with a slot inclined with respect to the longitudinal axis of the shaft, and a stationary pin secured to said housing is engaged in said slot.

References Cited by the Examiner
UNITED STATES PATENTS

| | | | |
|---|---|---|---|
| 379,614 | 3/1888 | Smith | 160—319 X |
| 646,549 | 4/1900 | Aberli | 40—86 |
| 1,539,774 | 5/1925 | Sato | 160—241 X |
| 1,569,946 | 1/1926 | Buettner | 40—86 X |
| 1,591,104 | 7/1926 | Robinson | 160—321 X |
| 1,618,760 | 2/1927 | Koelkebeck | 40—86 X |
| 1,992,944 | 3/1935 | Grudin | 40—86 |
| 3,089,258 | 5/1963 | Kavanagh | 35—35 |

FOREIGN PATENTS

| | | |
|---|---|---|
| 361,408 | 4/1906 | France. |
| 805,251 | 8/1936 | France. |

EUGENE R. CAPOZIO, *Primary Examiner.*

JEROME SCHNALL, *Examiner.*